G. J. WIEDEMAN AND J. H. HUGHES.
CHAIN CLAMP AND TIGHTENER.
APPLICATION FILED OCT. 4, 1918.
1,349,702.
Patented Aug. 17, 1920.
2 SHEETS—SHEET 1.
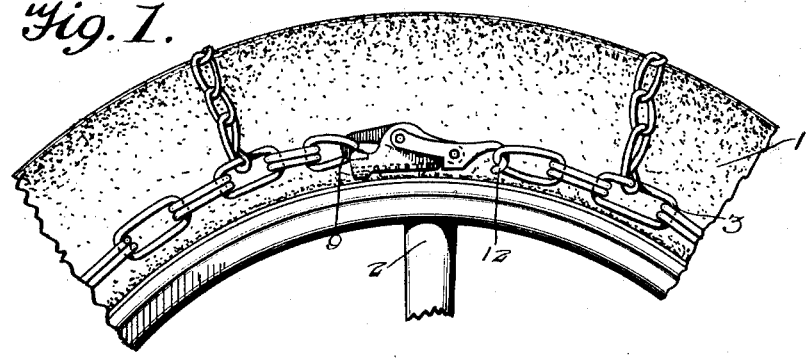
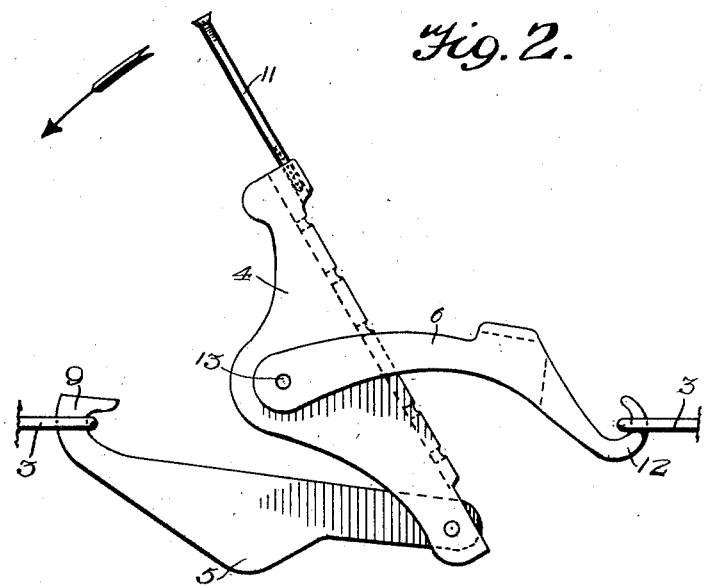
INVENTORS
GEORGE J. WEIDEMAN,
JAMES H. HUGHES,
BY
ATTORNEYS

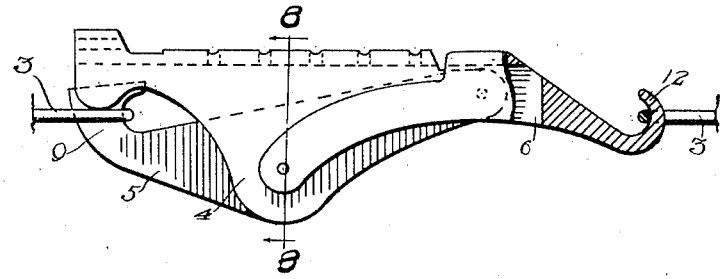
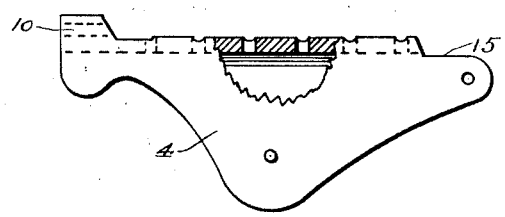
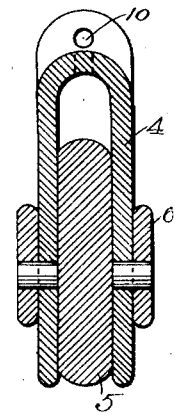
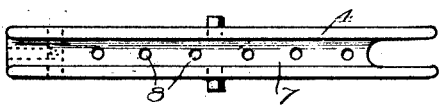
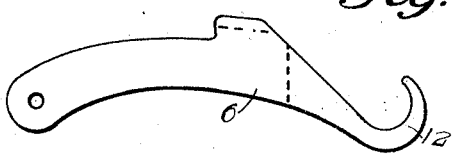
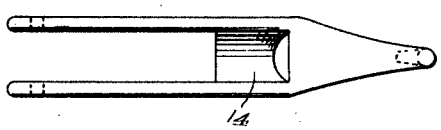

UNITED STATES PATENT OFFICE.

GEORGE J. WIEDEMAN, OF LEWISTOWN, AND JAMES H. HUGHES, OF WELTER, MONTANA.

CHAIN CLAMP AND TIGHTENER.

1,349,702. Specification of Letters Patent. Patented Aug. 17, 1920.

Application filed October 4, 1918. Serial No. 256,803.

*To all whom it may concern:*

Be it known that we, GEORGE J. WIEDEMAN and JAMES H. HUGHES, citizens of the United States, and residents of Lewistown and Welter, respectively, in the county of Fergus and State of Montana, have invented new and useful Improvements in Chain Clamps and Tighteners, of which the following is a specification.

Our invention is an improvement in chain clamps and tighteners, and has for its object to provide a device of the character specified, especially adapted for securing non-skid chains on motor vehicle tires, wherein mechanism is provided for easily and quickly tightening the chain and clamping it in place on the tire.

In the drawings:

Figure 1 is a partial side view of a tire and chain showing the improved clamp;

Fig. 2 is a side view of the clamp partly open.

Fig. 3 is a side view of the same closed, with parts in section;

Fig. 4 is a side view of the central section with parts in section;

Fig. 5 is a top plan view of the same;

Fig. 6 is a side view of one of the end sections;

Fig. 7 is a bottom plan view of the same;

Fig. 8 is a section on the line 88 of Fig. 3, looking in the direction of the arrows adjacent to the line.

The present embodiment of the invention is shown in connection with a tire 1 of ordinary construction, mounted upon the usual wheel 2, and an improved clamp is used for connecting the side chains 3 of a non-skid chain. The improved clamp comprises three sections, a central section 4, and end sections 5 and 6 respectively. The section 4 is substantially triangular in shape, having the base thereof longitudinally grooved as indicated at 7, and at the bottom of the groove the section is provided with a series of openings 8, the said openings extending longitudinally of the groove. This section 4 is substantially U-shape in cross section as shown in Fig. 8, and the section 5 is pivoted between the side walls of the section 4. The section 5 as shown in Figs. 2 and 3, is also subtantially triangular, and is provided at one end with a hook 9 for engagement by one end of the chain 3. That end of the section 5 remote from the hook is pivoted to the end of the section 4, and the section 4 at the end remote from the pivotal connection has a longitudinally extending opening 10 for receiving a nail or punch 11 for a purpose to be presently described. The section 6 of the clamp is in the form of a yoke consisting of a body 10 provided with a hook 12 for engagement by the other end of the chain 3, and arms which extend on opposite sides of the section 4, and are pivoted thereto as indicated at 13, at the apex of the said section. The arms are connected adjacent to the body by means of a cross web 14, and this cross web is adapted to engage over a cutaway portion 15 on the section 4 to limit the downward swinging movement of the section 6 with respect to section 4.

In use, to engage the clamp with the side chains, the parts of the clamp are extended as indicated in Fig. 2, until the hooks 9 and 12 will engage the ends of the side chain. The section 4 may be so swung that the three sections 4, 5 and 6 will be in substantial alinement, thus greatly increasing the distance between the hooks 9 and 12. After the hooks are engaged with the ends of the chain, the section 4 at the end provided with the opening 10, is swung on the hook 9 as indicated in Fig. 2, and additional leverage may be obtained by using a nail or punch to lengthen the section 4, the nail or punch being engaged with the opening 10. In this manner, the section 4 is moved until the parts are in the position of Fig. 1, when it will be held firmly in such position, and beyond the possibility of accidental opening of the clamp.

We claim:

A device of the character specified comprising a central section and two end sections, the central section being channeled and one end section being pivoted at one end thereto to fold within the channel, the other member being stirrup shaped, and consisting of a body and arms, the arms fitting on opposite sides of the central section and being pivoted thereto, and the body being adapted to engage that face of the central section remote from the first named end section to limit the closing movement of the said last named section, the pivotal connection between the arms of the stirrup shaped section and the central section being offset laterally with respect to the pivotal connection of the first named section with the central section and in the opposite direction from the body of the stirrup-shaped section.

GEORGE J. WIEDEMAN.
JAMES H. HUGHES.